US011082375B2

(12) United States Patent
Peuc (10) Patent No.: US 11,082,375 B2
(45) Date of Patent: Aug. 3, 2021

(54) OBJECT REPLICATION INSIDE COLLABORATION SYSTEMS

(71) Applicant: SAP SE, Walldorf (DE)

(72) Inventor: Goran Peuc, Dublin (IE)

(73) Assignee: SAP SE, Walldorf (DE)

( * ) Notice: Subject to any disclaimer, the term of this patent is extended or adjusted under 35 U.S.C. 154(b) by 6 days.

(21) Appl. No.: 16/590,415

(22) Filed: Oct. 2, 2019

(65) Prior Publication Data

US 2021/0105235 A1 Apr. 8, 2021

(51) Int. Cl.
| | |
|---|---|
| *H01L 51/10* | (2006.01) |
| *H04L 12/58* | (2006.01) |
| *H04L 12/18* | (2006.01) |
| *G06F 3/0486* | (2013.01) |

(52) U.S. Cl.
CPC ............ *H04L 51/08* (2013.01); *G06F 3/0486* (2013.01); *H04L 12/1831* (2013.01); *H04L 51/046* (2013.01); *H04L 51/18* (2013.01)

(58) Field of Classification Search
CPC ..... H04L 51/08; H04L 12/1831; H04L 51/18; H04L 51/046; G06F 3/0486
See application file for complete search history.

(56) References Cited

U.S. PATENT DOCUMENTS

| | | | | |
|---|---|---|---|---|
| 7,970,850 | B1* | 6/2011 | Callanan | H04L 51/046 709/206 |
| 9,477,375 | B1* | 10/2016 | Lewis | H04L 51/046 |
| 2009/0254840 | A1* | 10/2009 | Churchill | G06F 3/0481 715/753 |
| 2010/0138756 | A1* | 6/2010 | Saund | H04L 12/1827 715/758 |
| 2013/0346885 | A1* | 12/2013 | Singh | H04L 51/10 715/758 |
| 2016/0103564 | A1* | 4/2016 | Chao | G06F 3/04842 715/825 |
| 2016/0219006 | A1* | 7/2016 | Yuen | H04L 51/04 |
| 2016/0330150 | A1* | 11/2016 | Joe | G06F 16/951 |
| 2017/0038927 | A1* | 2/2017 | Lewis | G06F 3/0482 |
| 2017/0185244 | A1* | 6/2017 | Hall | G06Q 10/103 |
| 2017/0185581 | A1* | 6/2017 | Bojja | G06F 40/242 |
| 2017/0308290 | A1* | 10/2017 | Patel | G06F 3/04817 |
| 2017/0308587 | A1* | 10/2017 | Nagel | G06F 3/0236 |
| 2017/0344224 | A1* | 11/2017 | Kay | G06F 40/205 |
| 2018/0054405 | A1* | 2/2018 | Ritch | G06F 40/274 |
| 2018/0083898 | A1* | 3/2018 | Pham | H04L 51/02 |
| 2018/0083901 | A1* | 3/2018 | McGregor, Jr. | H04L 51/32 |
| 2018/0130094 | A1* | 5/2018 | Tung | G06Q 30/0267 |

(Continued)

*Primary Examiner* — Philip J Chea
*Assistant Examiner* — Wuji Chen
(74) *Attorney, Agent, or Firm* — Sterne, Kessler, Goldstein & Fox P.L.L.C.

(57) ABSTRACT

System, method, and various embodiments for providing a collaboration and object replication system are described herein. An embodiment operates by identifying, within a chat interface, a first portion of a text message that corresponds to an object of an application and a second portion of the text message that is comprised of characters of a character datatype. A new instance of the object is generated. The first portion of the text message is replaced with the new instance of the object within the chat interface. A selection of the new instance of the object from the chat interface is received for use within the application.

18 Claims, 4 Drawing Sheets

(56) References Cited

U.S. PATENT DOCUMENTS

2018/0336543 A1* 11/2018 Van Os ............... H04L 67/1078
2019/0026306 A1*  1/2019 Choi ....................... H04L 51/16
2019/0034395 A1*  1/2019 Curry .................... G06F 40/106

* cited by examiner

OBJECT REPLICATION INSIDE COLLABORATION SYSTEMS

BACKGROUND

Chat systems enable users to use text to communicate with one another. Many chat systems also enable users to send files to one another through the chat platform. However, if a user wants to edit, open, or access a file received via a chat or messaging platform, the user often has to first download the file, open a new application, and then upload and open the file into the application. In addition to consuming additional bandwidth, memory, and computing resources, performing these steps may also direct a user's attention away from the chat system, thereby causing the user to forget the context in which they may have received the file, and miss subsequent important messages.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a collaboration and object replication system.

Figure 1A:
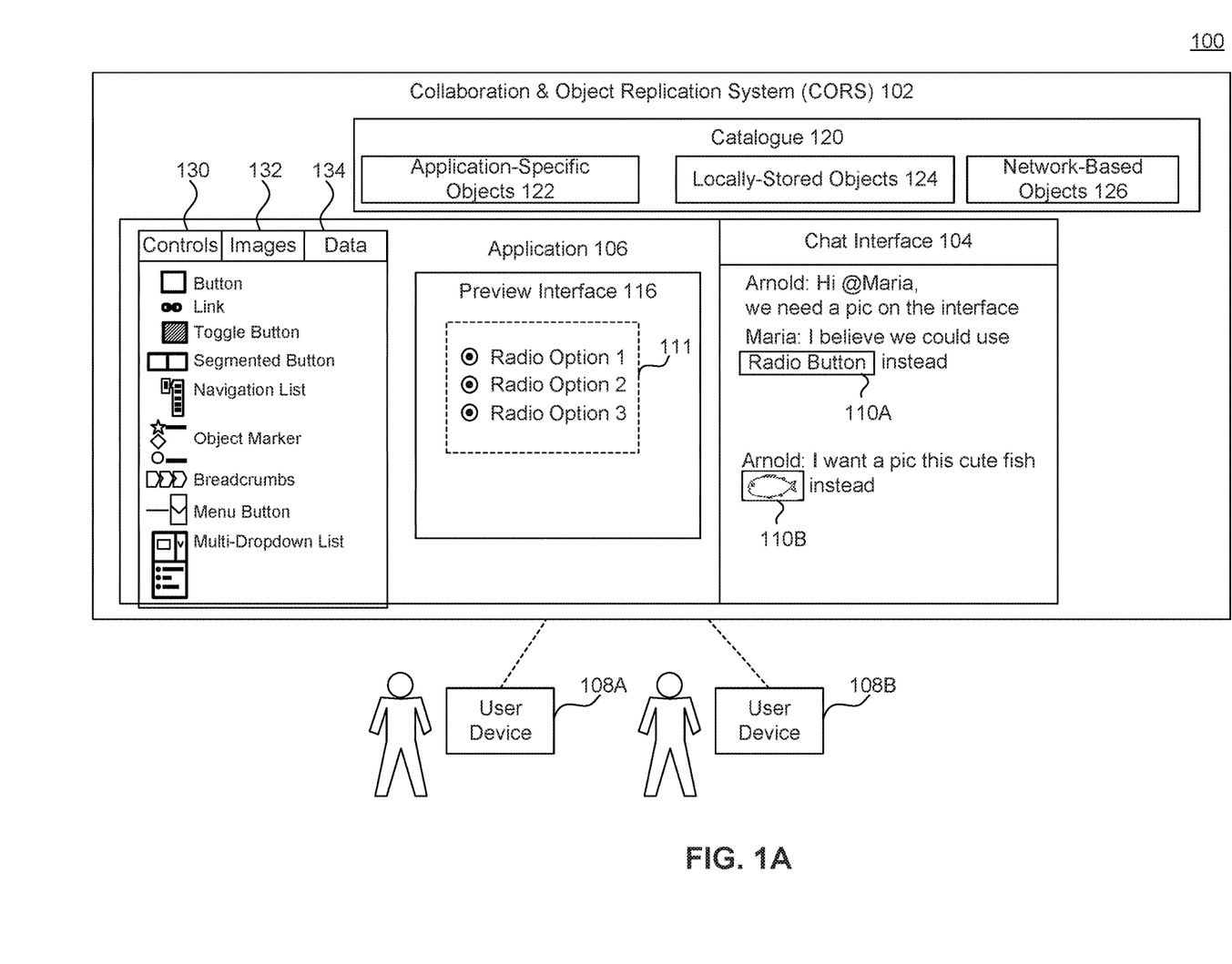
FIG. 1A is a block diagram illustrating example functionality for providing a collaboration and object replication system (CORS), according to some embodiments.

FIG. 1A is a block diagram 100 illustrating example functionality for providing a collaboration and object replication system (CORS) 102, according to some embodiments. CORS 102 enables greater collaboration between users operating user devices 108A and 108B of an application 106 who are communicating with each other through a chat interface 104.

Traditional chat systems enable users to both communicate with one another over text and share images and other files with one another within the confines of the chat system. However, if a user wants to perform an action on one of the files shared through the chat system, the user must download the file to a new storage location, exit the chat system to open up another application, and import the file into the application. Only then will the user be able to view, edit, modify, or otherwise access the shared file. This process is both cumbersome and time consuming for users, as well as a waste of system resources.

Additionally, the users in chat systems can talk about artifacts or elements of an application which cannot be attached as files, but can only be referenced to in text. For example, in a word processing application, buttons in the ribbon that are provided as shortcuts to use various functionality (such as bold, paragraph formatting, text size, text color, heading, etc.) are logical entities. These logical entities cannot be attached or shared via a traditional chat system, but instead can only be described to users via text.

For example, in a chat system, a user could type "You have to press the Track Changes button." However there is no capability enabling a user to attach the button or share it in a chat message such that it is selectable or usable by the other participating chat user(s). This may cause a problem on the reader's side, because receiving the text description of a "Track Changes button" now requires the user to manually go and find or figure out where that button is actually located in order to press or activate it.

CORS 102 addresses this problem by enabling users to share functional or selectable, application-specific entities or objects directly from a chat interface 104. For example, rather than having to select into various menu structures to find the Track Changes button, a receiving chat user may select the Track Changes button as it has been shared directly from the chat interface 104.

Further, leaving the chat system may be undesirable for users because they may miss important messages that are received while they are performing other actions required to access the shared file, or they may forget the context as to why the file was shared in the first place. For example, if through the chat system, a user was directed to perform a number of editing steps with or on the file, it may be difficult for the user to remember all the steps if they move away from the chat system. This will result in substantial unnecessary back-and-forth toggling between different windows by the user, which is itself a drain on system resources.

CORS 102 may overcome these and other issues plaguing traditional chat systems by making shared files immediately accessible to users 108A, 108B directly from the chat interface 104 within the context of an application 106. CORS 102 may eliminate or reduce the redundancy and waste of processing resources that would otherwise be required in receiving, downloading, opening a new application, and then uploading the file to the application 106. In addition CORS 102 allows a user to remain focused on the chat interface 104 while accessing the shared file.

Chat interface 104 may include any real-time, synchronous, or asynchronous communication system that enables two or more users 108A, 108B (collectively referred to as users 108) to communicate with one other through text, speech-to-text, and sending files (such as image, audio, video, text, or other multimedia files). As used herein, the terms users 108 and user devices 108 may be used interchangeably. One will understand that a user may be operating a user device in interacting with the systems as illustrated in FIG. 1A and as described herein.

An embodiment of chat interface 104 as referred to herein will be that of a real-time and synchronous, text-based communication system. However, one skilled in the art will understand other chat interface 104 embodiments may be used, including, but not limited to email and SMS (short messaging service) or text messaging on mobile devices. In another embodiment, chat interface 104 may include real-time video and/or audio capabilities, text-to-speech conversion, and/or file sharing capabilities, to name just some examples.

In an embodiment, chat interface 104 may be integrated into or otherwise communicatively coupled to an application 106. Chat interface 104 and application 106 may directly or indirectly (e.g., through the use of application programming interfaces (APIs)) be configured to communicate with one another.

Application 106 may be any app, application, or program which may benefit from allowing two or more users to communicate with each through a chat messaging system regarding use of application 106, such as chat interface 104.

An embodiment of application 106 as described herein will be of an interface builder (such as a website builder) in which the users 108 are communicating about which elements, objects, text, images, audio, multimedia, or other files should be included on the web page interface on which they are building using application 106. However one skilled in the art will appreciate that other types of applications may be used as well, including audio editing applications, spreadsheet applications, word processing applications, presentation creation applications, financial applications, gaming applications, etc.

In the example of FIG. 1A, users 108A, 108B may be communicating about and collaborating on a web page interface they are building using application 106 using their own individual user devices (e.g., laptops, desktops, mobile phones, or other computing devices). Application 106 may include a preview interface 116 that displays a current version of the interface being built using (the interface builder) application 106.

In an embodiment, preview interface 116 may be a shared screen visible to and modifiable by both users 108A, 108B that is updated in real-time. In another embodiment, preview interface 116 may be a screen or preview that is only visible to one of the users 108, or each user or a subset of the users 108 may have their own instantiation of application 106, including preview interface 116, operating on their own user devices. However, chat interface 104 may be updated in real-time and equally visible to all users 108 who see and have access to the same content on and from chat interface 104.

In the example chat, two users 108A, 108B, Arnold and Maria, are discussing what elements should be included on the interface they are designing using application 106. Arnold's first chat message is: "Hi @Maria, we need a pic on the interface".

The "@" may be a special symbol or character usable in the context of chat interface 104 that may be used to direct a message to a particular identified user, or to otherwise get the user's attention. In an embodiment, the character @ may cause chat interface 104 to highlight, bold, or underline the phrase @Maria on the screen of the user device Maria is using because Maria was identified as being one of the active or registered users of the chat interface 104. In an embodiment, sending a message with @ may cause a sound or other notification to be output by the user device of the designated user (i.e., on Maria's device). The @ may be particularly useful if there are more than two users 108 on the chat interface 104, and a message or question is directed to particular one or subset of the users.

Maria may respond to Arnold's message by typing in: "I believe we could use #RadioButton instead." In an embodiment, the "#" may be another special character or symbol that acts as a search trigger for CORS 102. The search trigger may cause CORS 102 to search a catalogue 120 of objects for files, objects, elements, controls, etc. that may be shared between two or more users via chat interface 104 that are related to or compatible with application 106. As described in greater detail herein, some of the catalogued objects may be downloadable for use outside of application 104 by users, while other objects (such as application-specific controls and logical entities are maintained inside the context of the chat interface 104 and/or application 106. In an embodiment, after identifying the search trigger "#" in the text input by user Maria, CORS 102 may search catalogue 120 for objects that have names that match or correspond to the phrase "RadioButton."

In an embodiment, CORS 102 may assemble and maintain a catalogue 120 of different objects that may be automatically replicated and imported into chat interface 104 by users 108. In an embodiment, catalogue 120 may include three different types of objects that may be shared between users via chat interface 104 and that are compatible with application 106: application-specific objects (ASOs) 122, locally-stored objects (LSOs) 124, and network-based objects (NBOs) 126). As used herein, the terms objects, elements, files (including images, audio, word processing, spreadsheet, multimedia, and other types of files), and resources may be used interchangeably to refer to any of the objects from catalogue 120, and may be referred to generally as "objects" or "catalogued objects".

ASOs 122 may include any discrete data objects or elements that are specific to or usable within application 106 (with which chat interface 104 is configured to communicate). In an embodiment, ASOs 122 may be application-specific and may not be independently usable or exportable to different programs or applications outside of application 106. In the example of FIG. 1A, the interface-builder application 106 includes three different tabs with selectable ASOs 122: control tab 130, images tab 132, and data tab 134.

Example controls 130 include a button, link, toggle button, etc., as illustrated. In an embodiment, any of these controls 130 may be dragged by a user 108 and dropped into preview interface 106 and used to create a webpage or other interface using application 106. While a different webpage or interface builder application may also use buttons, links, toggle buttons, and other similar controls, the particular controls 130 that are included in catalogue 120 may only be usable when building an interface or webpage using application 106. The list of controls 130 illustrated in FIG. 1 are intended to be exemplary and not exhaustive, as other controls may be available in different embodiments and different applications 106. For example, a music synthesizer application may include controls such as: drum beat, guitar strum, piano, etc.

The images tab 132 may include a list of files (in this case image or multimedia files) that have been uploaded and used with or are compatible to be used with application 106. In an embodiment, the catalogued images from images 132 may be user-specific, such that a user only has access to images or files that the particular user has uploaded (and does not have access to images uploaded by different users).

Or, for example, the catalogued images 132 may be project-specific such that a user can access any images or files associated with a particular object regardless of which user uploaded the image, video, or other multimedia file. Or, for example, the catalogued images 132 may include network-specific images, such that a user can access any images or files that have been uploaded and used with application 106 regardless of which user (of a designed network of users, such as employees of a company) or on which project the image was uploaded and/or used.

In an embodiment, the files listed under image tab 132 may include application-specific images that are only accessible or modifiable using application 106. For example, an image may be created using application 106 and may not be modifiable using other applications. In another embodiment, images 132 may include any images or other multimedia files that have been uploaded for use within application 106, but may be compatible with multiple different applications.

For example, one of the images 132 may include a video recorded on a user's mobile phone that has been uploaded for use on a webpage.

The data tab 134 may include a list of data objects that may be used within application 106. Data tab 134 may include discrete data objects where data has already been entered by one or more users, and/or shell data objects where data may be entered or modified by one or more users. Example data objects 134 include text boxes, tables, charts, word processing documents, etc. Each of controls 130, images 132, and data 134 are examples of ASOs 122 that may be catalogued by CORS 102.

Locally-stored objects (LSOs) 124 may include files that may be stored locally on a user device that the user 108 is using to access chat interface 104 and/or application 106. In an embodiment, CORS 102 may be authorized to scan one or more folders of a local hard drive to identify files that may be uploaded to or that compatible with application 106. The types of objects or files that are categorized or classified as LSOs 124 may vary based on the type of application 106 and/or the types of files stored on a user's hard drive to which the user has granted CORS 102 search and catalogue access. As new files are created, edited, or downloaded onto the user device, or files are removed, CORS 102 may automatically update catalogue 120.

Network-based objects 126 may include documents or files that are compatible with or importable into application 106 (similar to LSOs 124), except that NBOs 126 are stored across one or more different network locations, drives, or addresses. NBOs 126 may be stored on various devices that are all part of the same private network (e.g., such as university or company network), or files accessible via the cloud or Internet, such as webpages. NBOs 126 may also include other documents or files such as videos, audio, images, or other multimedia that are stored on a network server accessible via an internet protocol (IP) or web address that can be entered into a browser for viewing or accessing the file or document.

As may be appreciated from the description above, the catalogue 120 of objects (i.e., 122, 124, and 126) that may searchable or catalogued by CORS 102 may vary by user 108. When CORS 102 detects a trigger symbol ("#"), CORS 102 may automatically search catalogue 120 for any catalogued objects matching the text following the trigger symbol that a user may be able to share via chat interface 104. In another embodiment, no trigger symbol may be necessary. Instead, CORS 102 may continually or periodically search the text or words being entered by a user that match or are similar to catalogued objects, and may provide the user the option of including a catalogued object.

Figure 1B:
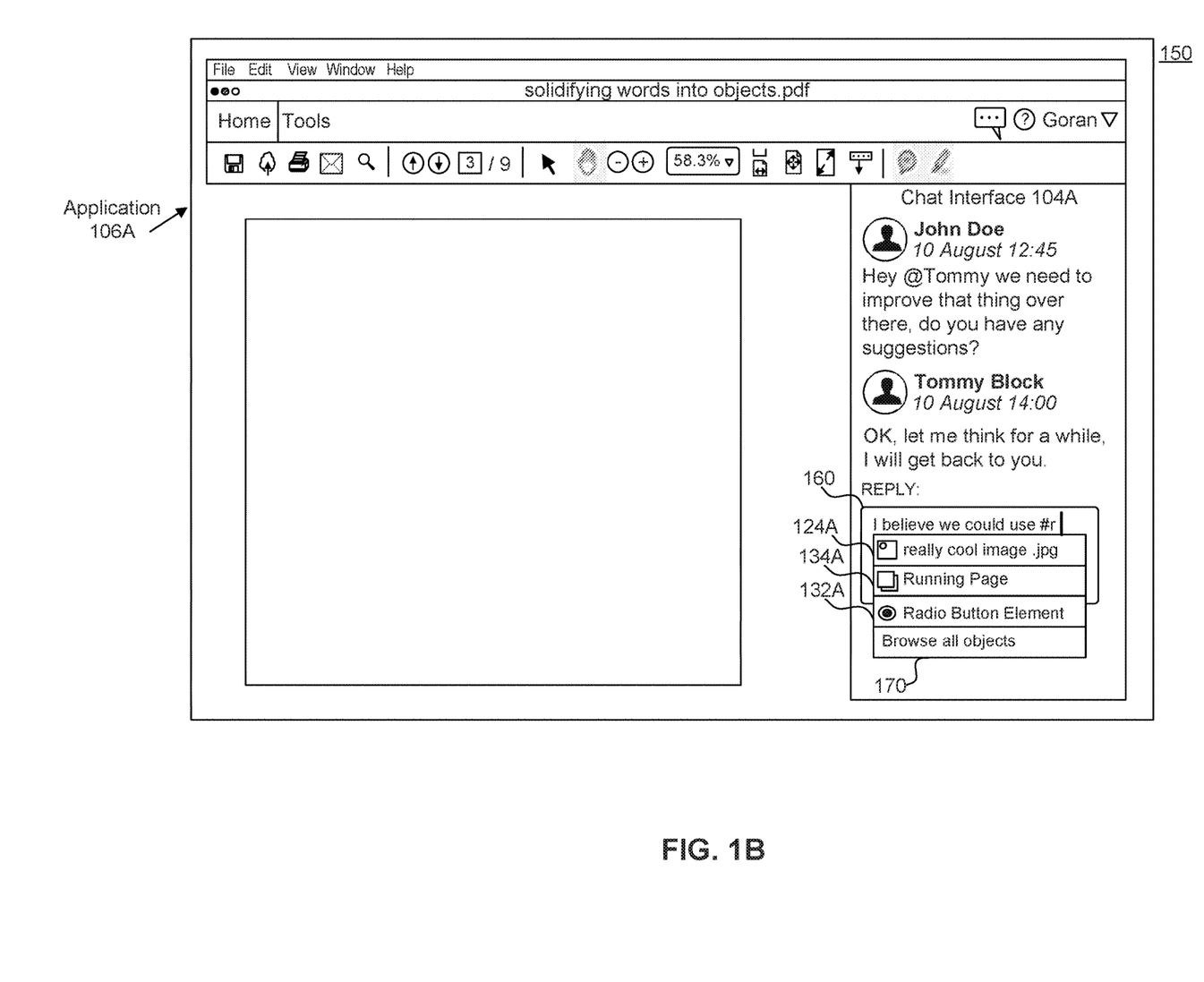
FIG. 1B is a block diagram illustrating example functionality for searching an object catalogue, according to some embodiments.

FIG. 1B is a block diagram 150 illustrating example functionality for searching an object catalogue 120, according to some embodiments. The chat interface 104A illustrates communications between John, Tommy, and a third user from whose point-of-view application 106A and chat interface 104A are being viewed.

In the example of FIG. 1B, this unnamed third user is entering a message or reply into a text bar 160 of chat interface 104A. In an embodiment, CORS 102 may search the entered text for a search trigger symbol "#". As illustrated, the # may have caused CORS 102 to activate the catalogue search functionality described above. CORS 102 has returned objects found in the user's catalogue 120 that begin with the letter "r".

The selectable objects that are returned from catalogue 120 include a locally-stored object image 124A, a data object 134A, and a control object 132A. The user may then select one or more objects from the drop down list illustrated in FIG. 1B to indicate which objects are to be included in and shared via chat interface 104A. In an embodiment, CORS 102 may also provide an additional option 170 that may enable the user to search catalogue 120.

The catalogue search triggered by option 170 (which may be provided responsive to identifying trigger #) may enable a user to search catalogue 120 based on any user-desired criteria. For example, CORS 102 may enable user to perform a search based on an object category (e.g., 122, 124, 126, 130, 132, 134), size of a file, filename, author, last used date, date created, date modified, file type, or any other data that may be used to search files and objects. The user may then select one or more objects from the catalogue 120 to be included in and shared via chat interface 104A.

Returning to FIG. 1A, when CORS 102 identifies that a user has selected an object from catalogue 120 to be shared via chat interface 104, CORS 102 may insert a replica 110A, 110B (referred to generally as replica 110) of the object into chat interface 104 replacing the text used to search for or identify the object. For example, as illustrated in Maria's message, the original text "#RadioButton" (as described above) has been replaced with a replica 110A of a radio button object (which may be an example ASO 122).

In response to Maria's message, Arnold types: "I want a pic of this cute fish cutef instead." However, while typing the text "cutef", CORS 102 may identify an object, such as an LSO 124, titled "CuteFishyFish.jpg", which may have been selected by Arnold. As such, the originally typed in text, "cutef" may have been replaced with a replica 110B of the "CuteFishyFish.jpg" image file within chat interface 104.

For example, rather than simply including an attachment or preview of the cutefishyfish file that is sent either before or after the text message that Arnold types ("I want a pic of this cute fish instead"), CORS 102 instead provides an in-line replica 110B of the image file that maintains the context around the file. The file is rendered and scaled to be in-line with the remaining characters in the text message.

For example, if Arnold wanted to share five different cat images, and had comments on each one in a conventional chat system, the comment of the message would be sent before or after the images of the cats. So for example, if Maria was to receive the message from Arnold that said "I like the third cat image the best, the orange cat image is blurry, do you think the yellowish cat is too orange?, and what do you think about the other two cat images?" followed by 5 different previews of five different cat images in the chat, it would be extremely time consuming and difficult for Maria to try and determine which image corresponds to which comment. She would have to try and map the message to each cat image.

CORS 102, instead, provides or displays an in-line replica 110 for each cat image within the text or sentence as illustrated by FIG. 1A. The same message sent by Arnold, by CORS 102, would instead read like "I like the third cat image the best [replica 110 of third cat image], the orange cat image is blurry [replica 110 of orange cat image], do you think the yellowish cat is too orange [replica 110 of yellowish cat image]?, and what do you think about the other two cat images? [replica 110 of one cat image] [replica 110 of second cat image]" Each [replica 110] in the message above is a placeholder for the actual image that is being referenced (as illustrated in Arnold's second chat message in FIG. 1A). This makes understanding the text and context of the message sent by Arnold, much easier for Maria and any other users on the chat.

Returning to the example of FIG. 1A, if Maria wanted to use the CuteFishyFish.jpg sent as replica 110B in application 106, rather than needing to download the image, then opening a new instance of the application, and uploading or importing the image into the application instance as may be necessary in other chat systems, CORS 102 enables Maria to simply drag the replica 110B from chat interface 104 into preview interface 116 of application 106 without any additional steps.

In an embodiment, upon receiving a drag-and-drop command for replica 110B, CORS 102 may expand the size of replica 110B to fit within context of preview interface 116 (which may have more available screen area relative to chat interface 104). As such, more details of the CuteFishyFish.jpg may be visible or may be more easily seen by Maria. Additionally, Maria may also edit the image of the fish directly from application 106 and use the image in the user interface. Similarly, Arnold and any other users on the chat may also drag and drop or otherwise use the fish image file replica 110B directly from chat interface 104.

A replica 110 is a usable, accessible copy of a selected object from catalogue 120. For example, rather than simply sending a link, attachment, or reference to an object or file, CORS 102 creates a new instance or copy of the selected object and makes it accessible or usable for use within application 106 directly from chat interface 104 using a drag-and-drop or copy-paste command. In an embodiment, replica 110 can be embedded into a text message while maintaining its file type, which is different from the character type typically used in a text message. For example, rather than sending an image file at the end of a text message, the replica 110 can be sent in line with the text of the message, and the recipient may save, forward, share or perform any other actions with regard to the replica 110 as may be performed with the image file at the end of the text message.

As noted above, in addition to providing replicas of files (e.g., such as replica 110B), CORS 102 also enables replicas 110A to be provided for application-specific objects 122, such as controls 130 via chat interface 104. For example, rather than Maria simply referring to a radio button, and then requiring Arnold to search through his instance of application 106 (which may be operating locally or independently on his own user device) to find the radio button to which Maria was referring (which can become particularly troublesome if identifying the radio button requires different levels of menu traversal or there are different styles of radio buttons available through application 106), CORS 102 provides a replica 110A of the radio button to which Maria is referring in chat interface 104. Arnold can then simply drag-and-drop replica 110A of the selected radio button from chat interface 104 into preview interface 116 or another portion of application 106 as shown, to view, edit, or use the radio button object 111 in application 106.

As illustrated in FIG. 1A, the replica 110A of the radio button displayed in chat interface 104 may appear different from the radio button object 111 illustrated in preview interface 116. In an embodiment, the various objects of catalogue 120 may include different visual representations based on whether they are being displayed in application 106 or chat interface 104. Because, for example, chat interface 104 may include less visual space relative to application 106, and so CORS 102 may provide a smaller or more condensed version of object to provide in-line with other text included in chat interface 104.

When CORS 102 or application 106 detects a drop command for a replica 110 on application 106, the replica 110 may be returned to its original or normal size for display within application 106 (which may then be resized or modified by the users within application 106). As illustrated, the representation of the radio button as replica 110A in chat interface 104 may include fewer details than the representation of the same radio button as displayed as radio button object 111 in application 106.

The visual display of a replica 110 is more than just an image that is used to replace text (e.g., such as image). The visual display of replica 110 is a resized catalogued object that is accessible for use within application 106. In an embodiment, replicas 110 import the properties of the underlying or original files or objects being replicated. For example, if the CuteFishyFish.jpg file can be edited in application 106, then so too can the replica 110B of the same file.

In an embodiment, replica 110 may be a new instance or copy of the selected object that is accessible directly from chat interface 104. For example, when a user selects the radio button from catalogue 120, CORS 102 may request an activation or instantiation of a new radio button control object from application 106. This may prevent, for example, Arnold from needing to navigate through a series of menus from application 106 to find and instantiate his own version of the radio button. Further, the shared radio button replica 110A may include configuration details provided by Maria that would not otherwise be accessible to Arnold (e.g., such as changes to the default text of selectable options of the radio button object 111).

In an embodiment, replica 110 is not a hyperlink or pointer to a particular object stored elsewhere, but instead, replica 110 is a selectable, editable copy of the selected object that may be dragged-and-dropped or copied-and-pasted directly from chat interface 104 into application 106. For example, as referenced above, a hyperlink may require a user to first select the link, which may cause another application, such as a web browser, to open in order to view the referenced file, image or document. In many such instances, the opening of the new application automatically opens a new user interface that is part of the new application. The newly opened interface is typically opened "on top" of the other user interfaces and thereby obscures either partially or wholly the first user interface the user was working in when opening the hyperlink or pointer. In addition, typically only one user interface is active at any time and that is typically, but not always, the user interface that is "on top." Thus, opening another file through a hyperlink or pointer takes the user away from the user interface that contains the link, deactivates it and defaults the user to the new user interface associated with the application for which the file is associated. CORS 102 addresses these and other issues.

In an embodiment, if a user 108 was to enter text that corresponds to a network address (e.g., IP address, network address, or internet/web address) of an object, CORS 102 may retrieve a local copy of the referenced file and provide the file as replica 110. For example, assume that Maria says: "How about this image of a shark www.sharkimages.com/crazyshark.html." Rather than (or in addition to) providing the hyperlink to the web address, CORS 102 may capture a screenshot of the shark image or webpage which may be provided as a replica 110 in chat interface 104.

If the link was to a specific video or image, CORS 102 may save a copy of the video or image which would then be made available as a replica 110. This may provide the added advantage, that if the referenced network file is later moved, renamed, edited, or deleted, a replica 110 of the file may still be saved within and with the chat between users 108 and may remain accessible to the users 108 of chat interface 104. Whereas the link of a hyperlink may no longer work because of the changes.

In an embodiment, a radio button or other catalogued object may also be inserted into application 106 using shortcut keys that are specific to the application 106. For example, a user 108 pressing the ctrl+R keys may cause radio button object 111 to be displayed in preview interface 106. In an embodiment, chat interface 104 may include or import these shortcuts as well. For example, Maria pressing the ctrl+R keys while typing text in chat interface 104 may cause CORS 102 to create or generate the radio button replica 110A place it within chat interface 104 as illustrated.

Figure 2:
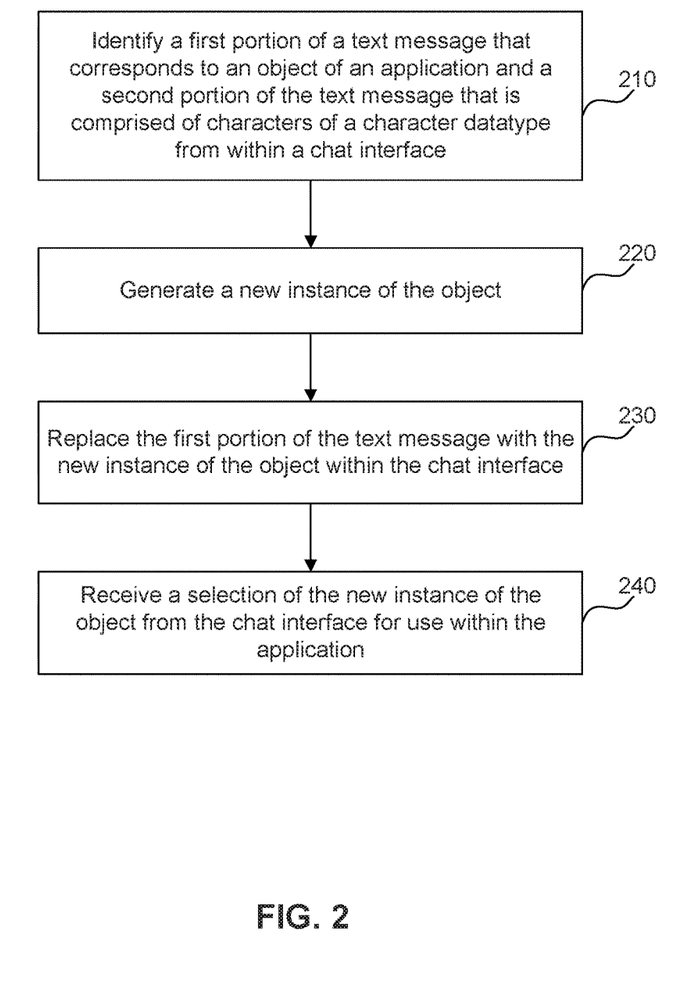
FIG. 2 is a flowchart illustrating example operations for providing a collaboration and object replication system, according to some embodiments.

FIG. 2 is a flowchart 200 illustrating example operations for providing a collaboration and object replication system, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1A. However, method 200 is not limited to the example embodiments.

In 210, a first portion of a text message that corresponds to an object of an application and a second portion of the text message that is comprised of characters of a character datatype are identified within a chat interface. For example, chat interface 104 may include text (including voice-to-text) that is communicated between two or more users 108. From the text exchanged between the users, CORS 102 may identify that Maria's text references a radio button object 111 of application 106 (that has been cataloged 120), while Arnold's text references or matches the file name of an image that has also been catalogued in catalogue 120 by CORS 102. The object 111 may be an image file, an audio file, an element of application 106, or other datatype that is different from the alphanumeric text of the messages exchanged via chat interface 104.

In 220, a new instance of the object is generated. For example, in response to a selection of the radio button 132A of application 106 by Maria (as illustrated in FIG. 1B), CORS 102 may request the instantiation of a new radio button object 111 from application 106. This new instantiation may be saved as a replica 110A and displayed in line with the text of chat interface 104. When Arnold selects the image file corresponding to the fish, CORS 102 may import the image file within application 106, and save the imported object as replica 110B.

In 230, the first portion of the text message is replaced with the new instance of the object within the chat interface. For example, the original text entered by Maria which may have included for example "# Rad", "radiob", "RadioButton", etc. may be replaced with replica 110A, while the name of the image file may be replaced with replica 110B.

In 240, a selection of the new instance of the object from the chat interface for use within the application is received. For example, a drag-and-drop command by Arnold (or Maria) on replica 110A may result in the display of an expanded or resized object 111 as illustrated in preview interface 116.

Figure 3:
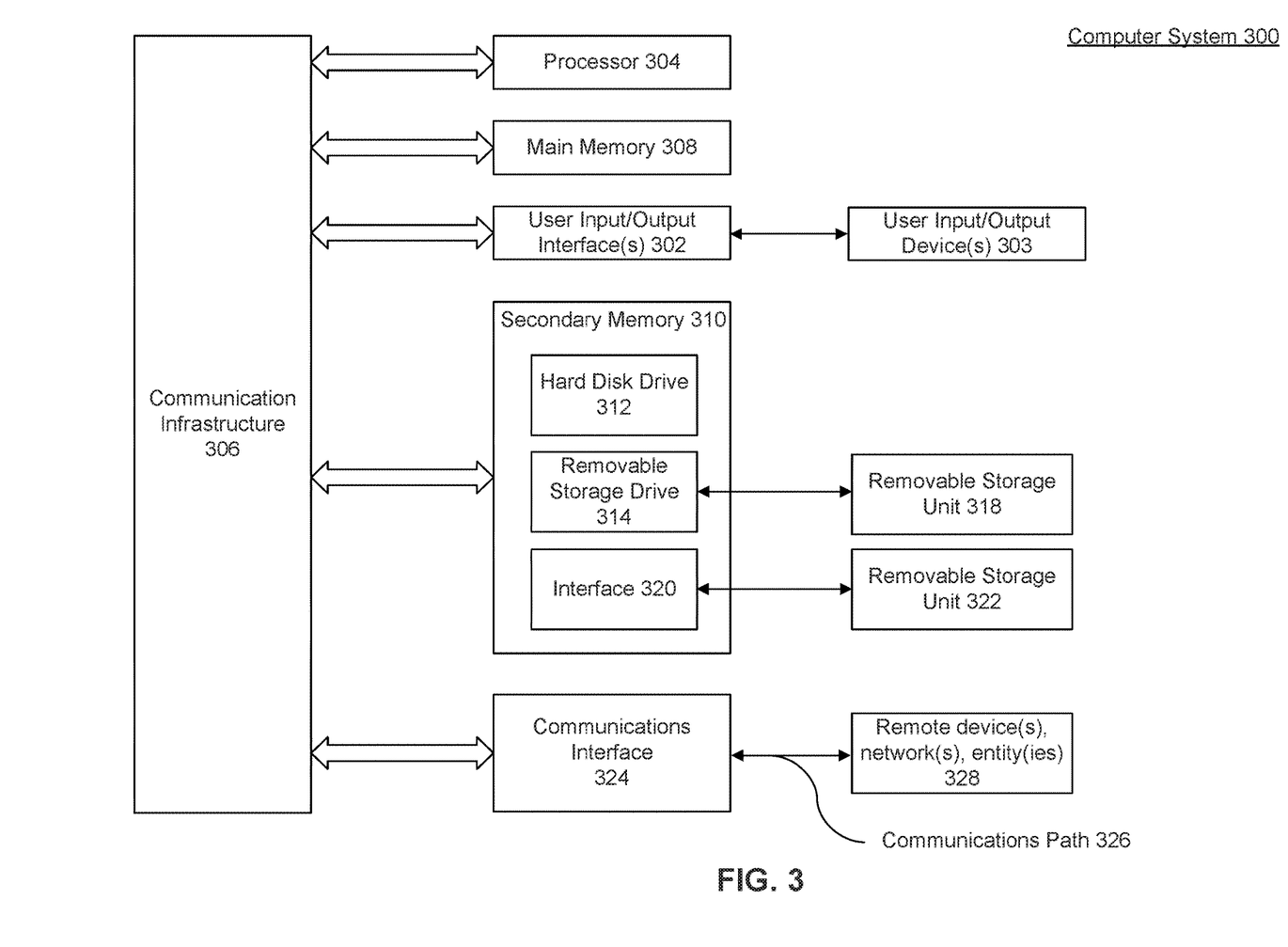
FIG. 3 is example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include customer input/output device(s) 303, such as monitors, keyboards, pointing devices, etc., which may communicate with communication infrastructure 306 through customer input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
identifying, within a chat interface, a first portion of a text message that corresponds to an object of an application and a second portion of the text message that is comprised of characters of a character datatype, wherein the object is of a first datatype that is different from the character datatype of the second portion of the text message;
receiving, through the chat interface, a selection of a file corresponding to the object from a first user device operating a first instance of an application;
generating a first instance of the object;
replacing, within the chat interface, the first portion of the text message with the first instance of the object;
receiving a drag selection of the first instance of the object from the chat interface from a second user device;
receiving, from the second user device, a drop indication of the first instance of the object from the chat interface into a second instance of the application operating on the second user device;
responsive to the drop indication, generating a second instance of the object for use within the application;
displaying the second instance of the object to the first user device and the second user device; and
receiving one or more modifications to the second instance of object.

2. The method of claim 1, wherein the generating comprises:
   identifying a plurality of objects of the application that correspond to the first portion of text, wherein at least one of the plurality of objects is customizable;
   receiving a selection of one of the plurality of objects; and
   generating the new instance of the selected one of the plurality of objects.

3. The method of claim 1, wherein the displaying the second instance of the object comprises:
   displaying the second instance of the object in a preview interface of the application, wherein both the first user device and the second user device are configured to display the second instance of the object in the preview interface; and
   receiving the one or more modifications to the second instance of object as displayed within the preview interface.

4. The method of claim 1 wherein the replacing comprises:
   replacing the identified portion of text with the first instance of the object that is sized to fit within the chat interface, wherein the first instance comprises a first visual representation of the object.

5. The method of claim 4, wherein the generating the second instance comprises:
   displaying a second visual representation of the first instance of the object that is sized to fit within a preview interface of the application.

6. The method of claim 5, wherein the second visual representation includes one or more details not included in the first visual representation.

7. The method of claim 1, wherein the identifying comprises:
   identifying a trigger command corresponding to the identified portion of text, wherein the chat interface includes at least another portion of text independent of the trigger command.

8. A system comprising:
   a memory; and
      at least one processor coupled to the memory and configured to perform operations comprising:
      identifying, within a chat interface, a first portion of a text message that corresponds to an object of an application and a second portion of the text message that is comprised of characters of a character datatype, wherein the object is of a first datatype that is different from the character datatype of the second portion of the text message;
      receiving, through the chat interface, a selection of a file corresponding to the object from a first user device operating a first instance of an application;
      generating a first instance of the object;
      replacing, within the chat interface, the first portion of the text message with the first instance of the object;
      receiving a drag selection of the first instance of the object from the chat interface from a second user device;
      receiving, from the second user device, a drop indication of the first instance of the object from the chat interface into a second instance of the application operating on the second user device;
      responsive to the drop indication, generating a second instance of the object for use within the application;
      displaying the second instance of the object to the first user device and the second user device; and
      receiving one or more modifications to the second instance of object.

9. The system of claim 8, wherein the generating comprises:
   identifying a plurality of objects of the application that correspond to the portion of text, wherein at least one of the plurality of objects is customizable;
   receiving a selection of one of the plurality of objects; and
   generating the new instance of the selected one of the plurality of objects.

10. The system of claim 8, wherein the displaying the second instance of the object comprises:
   displaying the second instance of the object in a preview interface of the application, wherein both the first user device and the second user device are configured to display the second instance of the object in the preview interface; and
   receiving the one or more modifications to the second instance of object as displayed within the preview interface.

11. The system of claim 8, wherein the replacing comprises:
   replacing the identified portion of text with the first instance of the object that is sized to fit within the chat interface, wherein the first instance comprises a first visual representation of the object.

12. The system of claim 11, wherein the generating the second instance comprises:
   displaying a second visual representation of the first instance of the object that is sized to fit within a preview interface of the application.

13. The system of claim 12, wherein the second visual representation includes one or more details not included in the first visual representation.

14. The system of claim 8, wherein the identifying comprises:
   identifying a trigger command corresponding to the identified portion of text, wherein the chat interface includes at least another portion of text independent of the trigger command.

15. A non-transitory computer-readable device having instructions stored thereon that, when executed by at least one computing device, cause the at least one computing device to perform operations comprising:
   identifying, within a chat interface, a first portion of a text message that corresponds to an object of an application and a second portion of the text message that is comprised of characters of a character datatype, wherein the object is of a first datatype that is different from the character datatype of the second portion of the text message;
   receiving, through the chat interface, a selection of a file corresponding to the object from a first user device operating a first instance of an application;
   generating a first instance of the object;
   replacing, within the chat interface, the first portion of the text message with the first instance of the object;
   receiving a drag selection of the first instance of the object from the chat interface from a second user device;
   receiving, from the second user device, a drop indication of the first instance of the object from the chat interface into a second instance of the application operating on the second user device;
   responsive to the drop indication, generating a second instance of the object for use within the application;
   displaying the second instance of the object to the first user device and the second user device; and
   receiving one or more modifications to the second instance of object.

16. The device of claim 15, wherein the generating comprises:
   identifying a plurality of objects of the application that correspond to the portion of text, wherein at least one of the plurality of objects is customizable;
   receiving a selection of one of the plurality of objects; and generating the new instance of the selected one of the plurality of objects.

17. The device of claim 16, wherein the displaying the second instance of the object comprises:
   displaying the second instance of the object in a preview interface of the application, wherein both the first user device and the second user device are configured to display the second instance of the object in the preview interface; and
   receiving the one or more modifications to the second instance of object as displayed within the preview interface.

18. The method of claim 1, wherein the replacing comprises:
   replacing the first portion of the text message with the first instance of the object, wherein the text message includes text on a same line of the first instance of the object before or after the first instance of the object on the same line.

* * * * *